United States Patent [19]

Deshon et al.

[11] Patent Number: 5,237,402
[45] Date of Patent: Aug. 17, 1993

[54] DIGITAL IMAGE PROCESSING CIRCUITRY

[75] Inventors: Mary Deshon, Winthrop; Allan Green, Framingham, all of Mass.

[73] Assignee: Polaroid Corporation, Cambridge, Mass.

[21] Appl. No.: 737,768

[22] Filed: Jul. 30, 1991

[51] Int. Cl.$^5$ .......................... G03F 3/08; H04N 1/46; H04N 9/64; H04N 5/14
[52] U.S. Cl. .................................... 358/520; 358/500; 358/37; 358/166
[58] Field of Search .................. 358/75, 80, 443, 447, 358/448, 463, 30, 31, 36, 37, 39, 40, 160, 166, 167

[56] References Cited

U.S. PATENT DOCUMENTS

| | | |
|---|---|---|
| 3,972,066 | 7/1976 | Seki et al. ................. 358/76 |
| 4,571,635 | 2/1986 | Mahmoodi et al. ............ 358/284 |
| 4,622,582 | 11/1986 | Yamada ...................... 358/80 |
| 4,639,771 | 1/1987 | Hattori et al. ............... 358/80 |
| 4,641,184 | 2/1987 | Alston ....................... 358/75 |
| 4,654,720 | 3/1987 | Tozawa ...................... 358/283 |
| 4,654,722 | 3/1987 | Alkofer ...................... 358/284 |
| 4,670,793 | 6/1987 | Yamada et al. ............... 358/284 |
| 4,724,489 | 2/1988 | Oldershaw ................... 358/284 |
| 4,727,425 | 2/1988 | Mayne et al. ................ 358/80 |
| 4,729,016 | 3/1988 | Alkofer ...................... 358/80 |
| 4,734,763 | 3/1988 | Urabe et al. ................. 358/80 |
| 4,736,244 | 4/1988 | Shiota et al. ................ 358/76 |
| 4,736,245 | 4/1988 | Seto et al. .................. 358/76 |
| 4,745,465 | 5/1988 | Kwon ........................ 358/80 |
| 4,745,466 | 5/1988 | Yoshida et al. .............. 358/80 |
| 4,745,467 | 5/1988 | Sekizawa et al. ............. 358/80 |
| 4,752,882 | 6/1988 | Kawamura .................... 358/80 |
| 4,768,082 | 8/1988 | Hiratsuka et al. ............ 358/13 |
| 4,789,892 | 12/1988 | Tsuzuki et al. .............. 358/80 |
| 4,796,086 | 1/1989 | Ohta et al. .................. 358/80 |
| 4,802,107 | 1/1989 | Yamamoto et al. ............. 324/525 |
| 4,812,879 | 3/1989 | Suzuki ....................... 355/38 |
| 4,812,902 | 3/1989 | Fuchsberger ................. 358/80 |
| 4,812,903 | 3/1989 | Wagensonner et al. .......... 358/80 |
| 4,814,867 | 3/1989 | Tsuda et al. ................. 358/80 |
| 4,814,891 | 3/1989 | Uchiyama et al. ............. 358/296 |
| 4,819,077 | 4/1989 | Kikuchi et al. .............. 358/98 |
| 4,819,193 | 4/1989 | Imao ......................... 364/526 |
| 4,825,297 | 4/1989 | Fuchsberger et al. .......... 358/284 |
| 4,829,323 | 5/1989 | Suzuki et al. ............... 346/140 |
| 4,831,434 | 5/1989 | Fuchsberger ................. 358/80 |
| 4,839,721 | 6/1989 | Abdulwahab et al. .......... 358/80 |
| 4,839,722 | 6/1989 | Barry et al. ................. 358/80 |
| 4,841,360 | 6/1989 | Birgmeir ..................... 358/80 |
| 4,841,361 | 6/1989 | Matsunawa et al. ............ 358/80 |
| 4,841,362 | 6/1989 | Urabe et al. ................. 358/80 |
| 4,843,379 | 6/1989 | Stansfield ................... 340/701 |
| 4,853,768 | 8/1989 | Suzuki et al. ............... 358/80 |
| 4,941,190 | 7/1990 | Joyce ........................ 382/54 |
| 5,008,741 | 4/1991 | Knierim et al. .............. 358/31 |

Primary Examiner—Edward L. Coles, Sr.
Assistant Examiner—Thomas D. Lee
Attorney, Agent, or Firm—Ralph R. Veseli; Edward S. Roman

[57] ABSTRACT

Improved digital image processing circuitry for sharpening edges and details of a recorded image digitally while minimizing the amplification of noise in the input recorded image provides an output recorded image which is the sum of chrominance signals processed by color processing circuitry and luminance signals processed by color processing circuitry and sharpness circuitry. Input recorded images are provided for concurrent parallel processing by both the color processing circuitry and the sharpening circuitry in a manner whereby the color processing circuitry generates low spatial frequency luminance signals and the sharpness circuitry generates high spatial frequency luminance signals both of which are subsequently combined to provide an output signal in which the amplitude of the high spatial frequency noise component associated therewith is minimized.

14 Claims, 1 Drawing Sheet

DIGITAL IMAGE PROCESSING CIRCUITRY

FIELD OF THE INVENTION

This invention relates generally to an improved digital electronic image processing circuitry for sharpening an electronically recorded image and, in particular, to an improved digital image processing circuitry for sharpening edges and details of a digitally recorded image without amplifying noise in the input recorded image.

BACKGROUND OF THE INVENTION

The human visual system perceives the high spatial frequencies of an image as sharpness and the low spatial frequencies as tonescale. That is, sharpens of an image is generally a function of how well the edges of objects in an image are perceived whereas the tonescale is a function of how the image's color and its gradual variation over the extent of the image are perceived. Since the human visual system perceives sharpened images much more favorably than unsharpened images, most electronic imaging systems which process recorded images attempt to provide sharpened images for human viewing.

In electronic imaging cameras, charge coupled devices (hereafter referred to as "CCDs") capture the image and introduce noise (hereafter referred to as "CCD noise") into the system. Typically, color processing circuitry then receives the recorded image with the inherent CCD noise and enhances and/or corrects the colors found in the recorded image. The color processing circuitry may transform the recorded image into a new tonescale and color coordinate system which is more suitable for processing by downstream circuitry and for eventual viewing. Unfortunately, the color processing circuitry also greatly amplifies the CCD noise.

A serially connected sharpening circuit then typically receives the color corrected recorded image in order to sharpen it. The sharpening circuit may receive the luminance components of the recorded image and sharpening algorithm. An example of such a mathematical sharpening algorithm is disclosed and explained in U.S. Pat. No. 4,941,190, entitled "Method and System for Enhancement of a Digitized Image", by Terrence H. Joyce which is incorporated herein by reference. Although different types of sharpening circuits attempt to differentiate between those high spatial frequency components attributable to noise and those attributable image information, such differentiation cannot be perfect and some portion of the high spatial frequency components of the noise is inevitably amplified. Thus, the sharpening as discussed above is always achieved at the expense of some increase in noise visibility. Therefore, the usefulness of sharpening circuitry is restricted by the amount of noise which becomes noticeably amplified after the recorded image is propagated therethrough.

As a result, a need exists in the art for an improved digital image processing circuit which does both color processing and image sharpening in a manner whereby the deleterious effects associated with the amplification of noise is minimized.

SUMMARY OF THE INVENTION

Embodiments of the present invention solve the above-identified problem by enhancing the edges and the details of selected elements of a recorded image comprising of a plurality of pixel values received directly from a two-dimensional photosensitive array while color processing in parallel other selected elements of the recorded image. In particular, one embodiment of the present invention operates to selectively combine color separation elements of the recorded image which have not been processed by the color processing circuitry and adaptively sharpen these elements to provide high spatial frequency combined electronic image data signals. These high spatial frequency combined electronic image data signals are added together with low spatial frequency luminance signals which are parallel processed by the color processing circuitry to provide combined luminance signals of the recorded image. As is obvious, the high spatial frequency combined electronic image data signals avoid being processed by the color processing circuitry and thus also avoid having the CCD noise associated with these signals amplified. Accordingly, this approach provides color processed and sharpened recorded images with little inherent CCD noise and a high subjective quality.

Specifically, sharpening circuitry and color processing circuitry both receive input electronic image data signals from the CCDs. These input electronic image data signals represent, on a pixel by pixel basis, the image sensed in a red-green-blue color coordinate system. The color processing circuitry, which can be either one 3-D look up table (hereafter referred to as a "LUT") or a LUT-matrix-LUT-matrix combination, color corrects these input electronic image data signals. In the preferred embodiment which employs a LUT-matrix-LUT-matrix combination, a first LUT transforms the input electronic image data signals into pseudo linear space, expands the tone rendition scale of these signals, and performs tonescale transformations on these signals. A first matrix transforms these electronic image data signals into the industry standard SMPTE C, NTSC, or any other color coordinate system. A second LUT compresses the tone rendition scale of these signals back to their original size and then performs another tonescale transformation on these signals. Finally, a second matrix transforms these electronic image data signals to a luminance-chrominance-chrominance color coordinate system and low pass filtering circuitry then passes the luminance components of the electronic image data signals below a first spatial frequency and the chrominance components of the electronic image data signals below a second spatial frequency.

While the color processing circuitry is processing these input electronic image data signals, the sharpness circuitry is also processing in parallel the same input electronic image data signals. Specifically, the sharpness circuitry combines linearly, non linearly, or by weighted average, the input electronic image data signals. The combined electronic image data signals are then provided to both a variance circuit and a high pass filtering circuit. The variance circuit provides variance signals to a third LUT which, in turn, provides an adaptive amplification factor to a first combining means which combines the adaptive amplification factor with the high pass filtered electronic image data signals. The combination of the variance circuit, the third LUT, and the summation means, thus, adaptively sharpen, on a pixel by pixel basis, the high pass filtered electronic image data signals. The output from the first combining means discussed above are adaptively amplified high spatial frequency composite electronic image data signals. These signals are adjusted by a fourth LUT and then combined via a third combining means with the low spatial frequency luminance signals provided by the low pass filtering circuit discussed above in conjunction with the color processing circuitry to provide much sharper and crisper combined luminance signals.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

DESCRIPTION OF THE PREFERRED EMBODIMENTS

Figure 1:
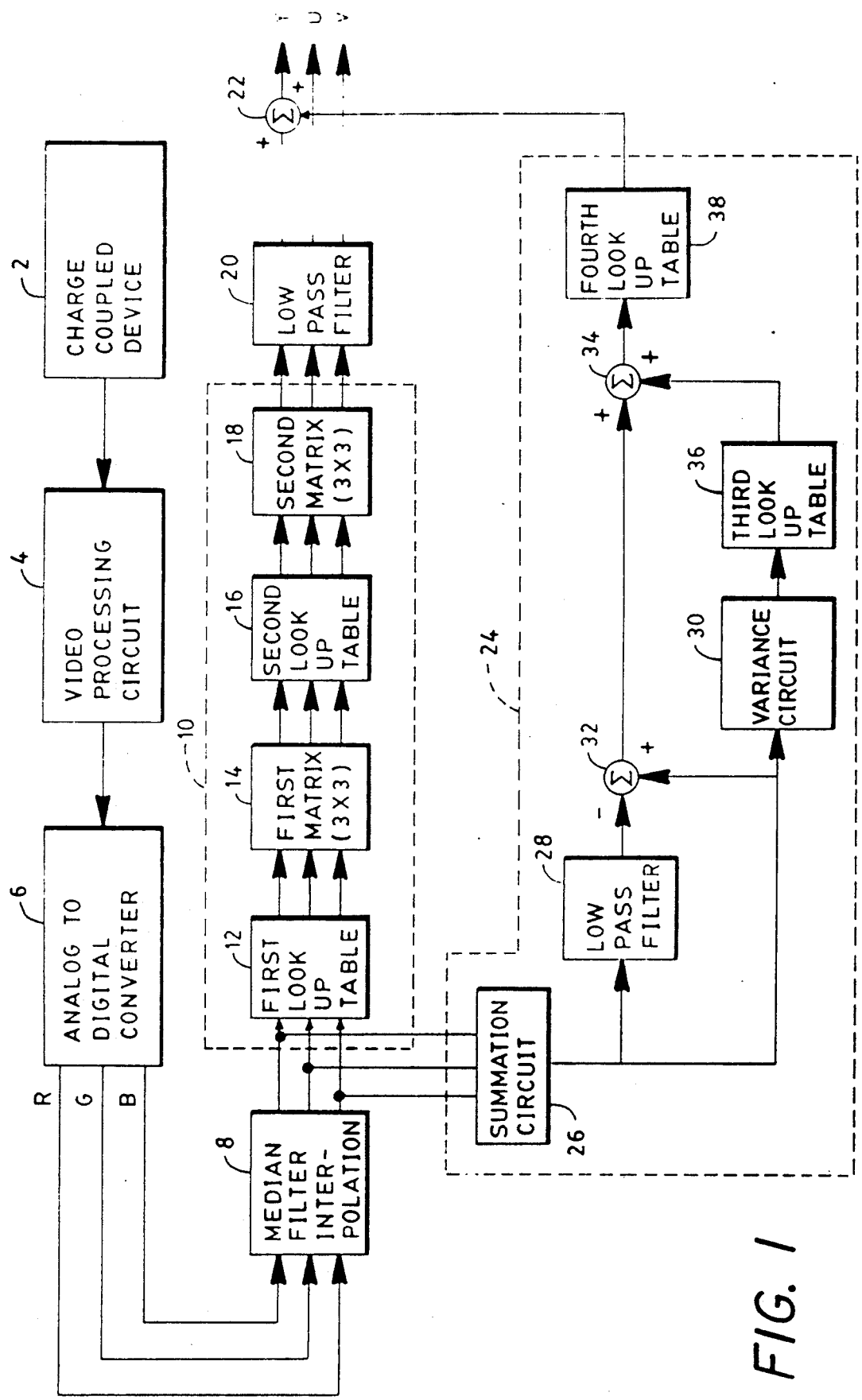
FIG. 1 is block diagram representation of an improved digital image processing circuit according to this invention.

Electronic imaging cameras for recording either motion or still images are in common usage today. Such cameras generally include, as is shown in the sole figure, a two-dimensional photosensitive array 2 which may comprise a high resolution charge coupled device (CCD), charge injection device (CID), or other sensors which receives the image scene light in a well-known manner by way of an objective lens and shutter (not shown). The image sensing array typically comprises a plurality of image sensing elements or pixels arranged in a two-dimensional array with each image sensing pixel converting the image defining light reflectants from the scene into a corresponding analog voltage value. The sampling is done sequentially for the three primary colors red, green, and blue (hereafter referred to as "RGB colors") and the image sensing elements are preferably arranged in a plurality of columns and rows. For imaging applications, the resolution of the electro-optically sampled image usually comprises about 1656 image points or pixels per line (horizontal) and 600 lines (vertical). Accordingly, each image has in the aggregate 1656×600 pixels wherein each pixel is assigned one of the RGB colors.

When an image is captured by an electronic imaging camera, a steady stream of analog voltage values associated with the pixel values for a given row of the image sensing elements are presented to a video processing circuit 4. The video processing circuit 4 compresses the analog voltage values that are associated with the highlights and shadows of the recorded image while emphasizing the analog voltage values that are associated with the midtones of the recorded image. In essence, the video processing circuit 4 compresses the tone of the analog voltages by using a tone compression curve having a gamma of about 0.4.

An analog-to-digital converter 6 then transforms, row by row, the analog voltages into a plurality of digital electronic image data signals representing the recorded image in a RGB color coordinate system. A median filter interpolation circuit 8 then receives the digital electronic image data signals and interpolates for non sampled RGB colors in a manner that substantially reduces color fringing as is fully described in U.S. Pat. No. 4,724,395 entitled "Median Filter Reconstruction Missing Color Samples" by William T. Freeman and which is now fully incorporated by reference herein. The median filter interpolation circuit 8 then presents the digital electronic image data signals to color processing circuitry 10.

The color processing circuitry 10 can be either one large 3-D LUT (not shown) or a LUT-matrix-LUT-matrix combination and both achieve the same object, namely, to transform the electronic image data signals into a color coordinate system which is suitable for viewing. Referring to the sole figure, a LUT-matrix-LUT-matrix is shown as the color processing circuitry 10. A first LUT 12 expands the tone rendition scale of the electronic image data signals into a pseudo linear space by expanding the output from 8 bits to 12 bits. This linearization of the electronic image data signals is accomplished through the use of an inverse gamma curve that has a gamma of approximately 2.2. The LUT 12 also performs tonescale transformation on these signals. A first matrix 14 then transforms the electronic image data signals into either the industry standard SMPTE C, NTSC, or any other color coordinate system. A second LUT 16 compresses the tone rendition scale of the electronic image input signals back to 8 bits by employing a gamma correction curve having a gamma of approximately 2.2. This second LUT 16 also performs tonescale transformation on these signals.

A second matrix 18 transforms these electronic image data signals in an RGB color coordinate system to a luminance-chrominance-chrominance color coordinate scale (hereafter referred to as "YUV color coordinate system"). It should be noted that several different luminance-chrominance-chrominance color coordinate systems exists and may be employed by the second matrix 18, for example, YUV or YIQ. However, for brevity, only the YUV color coordinate system transformation will be discussed. The transformation into the YUV color coordinate system is accomplished very simply according to the following equations:

$Y = 0.299R + 0.587G + 0.114B$
$U = B - Y$
$V = R - Y$

The electronic image data signals in the YUV color coordinate system are next low pass filtered by way of low pass filter 20. Specifically, the luminance components, i.e., the Y signals, are low pass filtered at a first spatial frequency while the pair of chrominance components, i.e., the U and V signals, are low pass filtered at a second spatial frequency. It should also be noted that each individual chrominance component of the electronic image data signals can also be low pass filtered at different spatial frequencies. The output low spatial frequency luminance signal is combined via first combining means 22 with a high spatial frequency combined electronic image data signal from sharpness circuitry 24 discussed below.

While the color processing circuitry 10 processes the electronic image data signals, sharpness circuitry 24 also processes in parallel these same electronic image data signals from the median filter interpolation circuit 8. Specifically, a summation circuit 26 combines either linearly or non linearly or by a weighted average, these electronic image data signals. These combined electronic image data signals are provided to both low pass filtering circuit 28 and variance circuit 30. The combination of the low pass filtering circuit 30 and a second combining means 32 effectively high pass filter the combined electronic image data signal which is then provided to a third combining means 34.

The variance circuit 30 provides variance signals in a well known manner to a third LUT 36. The variance signals are indicative of the statistical variance of the composite electronic image data signals for a select group of pixels surrounding each pixel to be enhanced by the sharpness circuitry 24. The third LUT 36 receives the variance signals and thereafter generates adaptive amplification factors which are provided to the second summation means 34. The adaptive amplification factors vary as a function of different values of variance signals so as to distinguish between signal noise and signal information in the composite electronic image data signals. A detailed description of the variance circuit 30 and the relationship of the adaptive amplification factors to the variance signals is disclosed and explained in U.S. patent application Ser. No. 351,930, entitled "Method for Adaptively Sharpening Electronic Images", by Woo-Jin Song, filed on May 15, 1989, which is hereby incorporated by reference into this application. The combination of the variance circuit 30, the third LUT 36, and the third combining means 34 adaptively sharpen on a pixel by pixel basis the high pass filtered composite electronic image data signals provided by the second combining means 32.

A fourth look up table 38 adjusts by a precompensation factor the adaptively sharpened high spatial frequency composite electronic image data signals. Finally, the high spatial frequency composite electronic image data signals are provided to the first combining means 22 and combined with the low spatial frequency luminance signals from the color processing circuitry 10. This provides much sharper and crisper combined luminance signals and hence electronic image data signals in which the amplification of high spatial frequency noise is minimized.

Other embodiments of the invention including additions, subtractions, deletions, and other modifications of the preferred disclosed embodiments of the invention will be obvious to those skilled in the art and are within the scope of the following claims.

What is claimed is:

1. Improved digital image processing circuitry for sharpening and transforming input electronic image data signals characterized by a first tonescale and a first color coordinate system to output electronic image signals characterized by a second tonescale and a second color coordinate system, having both luminance and chrominance components, the circuitry comprising:
    a) color processing means for receiving the input electronic image data signals characterized by the first tonescale and the first color coordinate system and transforming the input electronic image data signals into first intermediate electronic image data signals characterized by the second tonescale and the second color coordinate system;
    b) sharpening means for receiving the input electronic image data signals, differentiating between selected high and low spatial frequency components of the input electronic image data signals, and amplifying the selected high spatial frequency components of the input electronic image data signals to provide amplified high spatial frequency luminance signals;
    c) low pass filtering means for receiving the first intermediate electronic image data signals and transmitting those spatial frequency components of the first intermediate electronic image data signals below at least one select spatial frequency to provide second intermediate electronic image data signals; and
    d) combining means for combining the low spatial frequency luminance components of the second intermediate electronic image data signals with the amplified high spatial frequency luminance signals to provide sharpened luminance components which together with the chrominance components of the second intermediate electronic image data signals define the output electronic image data signals wherein the color processing means comprises:
    a first look up table containing values indicative of a first tonescale transformation wherein the first look up table receives the input electronic image data singles and provides tonescale matrixed corrected electronic image data signals;
    a first matrix containing first color coordinate transformation coefficients wherein the first matrix receives the tonescale matrixed corrected electronic image data signals and provides first color electronic image data signals;
    a second look up table containing values indicative of a second tonescale transformation wherein the second look up table receives the color matrixed electronic image data signals and provides second tonescale corrected electronic image data signals; and
    a second matrix containing second color coordinate system transformation coefficients wherein the second matrix receives the second tonescale corrected electronic image data signals and provides the first intermediate electronic image data signals.

2. The circuitry of claim 1 wherein the color processing means comprises a three dimensional look up table for receiving the input electronic image data signals characterized by the first tonescale and the first color coordinate system and for transforming the input electronic image data signals into first intermediate electronic image data signals characterized by the second tonescale and the second color coordinate system.

3. The circuitry of claim 1 wherein the first intermediate electronic image data signals are comprised of both luminance components and chrominance components, the low pass filtering means further comprising:
    a) first low pass filtering means for receiving the luminance components of the first intermediate electronic image data signals and transmitting those spatial frequency components of the luminance components of the first intermediate electronic image data signals below a first selected spatial frequency to provide luminance components of the second intermediate electronic image data signals; and
    b) second low pass filtering means for receiving the chrominance components of the first intermediate electronic image data signals and transmitting those spatial frequency components of the chrominance components of the first intermediate electronic image data signals below a second selected spatial frequency to provide chrominance components of the second intermediate electronic image data signals.

4. The circuitry of claim 1 wherein the first intermediate electronic image data signals are comprised of luminance components, first chrominance components, and second chrominance components, the low pass filtering means further comprising:

a) first low pass filtering means for receiving the luminance components of the first intermediate electronic image data signals and transmitting those spatial frequency components of the luminance components of the first intermediate electronic image data signals below a first selected spatial frequency to provide luminance components of the second intermediate electronic image data signals;

b) second low pass filtering means for receiving the first chrominance components of the first intermediate electronic image data signals and transmitting those spatial frequency components of the first chrominance components of the first intermediate electronic image data signals below a second selected spatial frequency to provide first chrominance components of the second intermediate electronic image data signals; and c) third low pass filtering means for receiving the second chrominance components of the first intermediate electronic image data signals and transmitting those spatial frequency components of the second chrominance components of the first intermediate electronic image data signals below a third selected spatial frequency to provide second chrominance components of the second intermediate electronic image data signals.

5. The circuitry of claim 1 wherein the first tonescale transformation and the second tonescale transformation are selected from the group comprising a gamma function and an inverse gamma function.

6. Improved digital image processing circuitry for sharpening and transforming input electronic image data signals characterized by a first tonescale and a first color coordinate system to output electronic image signals characterized by a second tonescale and a second color coordinate system, having both luminance and chrominance components, the circuitry comprising:

a) color processing means for receiving the input electronic image data signals characterized by the first tonescale and the first color coordinate system and transforming the input electronic image data signals into first intermediate electronic image data signals characterized by the second tonescale and the second color coordinate system;

b) sharpening means for receiving the input electronic image data signals, differentiating between selected high and low spatial frequency components of the input electronic image data signals, and amplifying the selected high spatial frequency components of the input electronic image data signals to provide amplified high spatial frequency luminance signals;

c) low pass filtering means for receiving the first intermediate electronic image data signals and transmitting those spatial frequency components of the first intermediate electronic image data signals below at least one select spatial frequency to provide second intermediate electronic image data signals; and d) combining means for combining the low spatial frequency luminance components of the second intermediate electronic image data signals with the amplified high spatial frequency luminance signals to provide sharpened luminance components which together with the chrominance components of the second intermediate electronic image data signals define the output electronic image data signals wherein the input electronic image data signals comprise a plurality of components for each pixled of the image being processed and wherein the sharpening means comprises:

summation means for receiving a select number of the components of the input electronic image data signals and for combining the components of the input electronic image data signals into composite electronic image data signals;

first filtering means for transmitting those spatial frequency components of the composite electronic image data signals above a select spatial frequency to provide only high spatial frequency signals associated with the composite electronic image data signals;

variance circuit for receiving the composite electronic image data signals and for providing variance signals therefrom which are indicative of the statistical variance of the composite electronic image data signals for a select group of pixels surrounding each pixel to be enhanced a first look up table containing values indicative of a plurality of adaptive amplification factors which vary as a function of different values of variance signals so as to distinguish between noise and signal information wherein the first look up table receives and transforms the variance signals to adaptive amplification factor signals;

second combining means for combining the high spatial frequency signals and the adaptive amplification factor signals to provide adaptively amplified high spatial frequency signals; and a second look up table containing values indicative of a plurality of precompensation factors which vary as a function of the different values of the adaptively amplified high spatial frequency signals wherein the second look up table receives and transforms the adaptively amplified high spatial frequency signals to compensated and adaptively amplified high spatial frequency signals which define the amplified high spatial frequency luminance signals.

7. The circuitry of claim 6 wherein the first filtering means comprises:

a) a low pass filter for receiving the composite electronic image data signals and transmitting those spatial frequency components of the composite electronic image data signals below a selected spatial frequency to provide low spatial frequency signals associated with the composite electronic image data signals; and b) combining means for transmitting those spatial frequency components of the composite electronic image data signals above the low spatial frequency signals to provide high spatial frequency signals associated with the composite electronic image data signals.

8. Improved digital image processing circuitry for sharpening and transforming color space signals to luminance signals and a pair of chrominance signals, the circuitry comprising:

a) color processing means for receiving the color space signals and transforming the color space signals into first intermediate luminance signals and a pair of first intermediate chrominance signals;

b) sharpening means for receiving the color space signals, differentiating between selected high and low spatial frequency components of the color space signals and amplifying the selected high spatial frequency components of the color space signals to provide amplified high spatial frequency luminance signals;

c) low pass filtering means for receiving the first intermediate chrominance and luminance signals and for transmitting those spatial frequency components of the first intermediate chrominance luminance signals that are below a select spatial frequency to provide second intermediate luminance signals and a pair of second intermediate chrominance signals; and d) combining means for combining the low spatial frequency components of the second intermediate luminance signals with the amplified high spatial frequency luminance signals to provide sharpened luminance signals wherein the color processing means comprises:

a first look up table containing values indicative of a first tonescale transformation wherein the first look up table receives the color space signals and provides first tonescale corrected color space signals;

a first matrix containing first color coordinate transformation coefficients wherein the first matrix receives the first tonescale corrected color space signals and provides matrixed color space signals;

a second look up table containing values indicative of a second tonescale transformation wherein the second look up table receives the matrixed color space signals and provides second tonescale corrected color space signals; and a second matrix containing second color coordinate system transformations coefficients wherein the second matrix receives the second tonescale corrected color space signals and provides the first intermediate chrominance signals and the pair of first intermediate luminance signals.

9. The circuitry of claim 8 wherein the color processing means comprises a three dimensional look up table for receiving the color space signals and transforming the color space signals into the first intermediate luminance signals and the pair of first intermediate chrominance signals.

10. The circuitry of claim 8 wherein the low pass filtering means further comprising:

a) first low pass filtering means for receiving the first intermediate luminance signals and transmitting those spatial frequency components of the fist intermediate luminance signals below a first selected spatial frequency to provide second intermediate luminance signals; and b) second low pass filtering means for receiving the pair of first intermediate chrominance signals and transmitting those spatial frequency components of the pair of first intermediate chrominance signals below a second selected spatial frequency to provide a pair of second intermediate chrominance signals.

11. The circuitry of claim 8 wherein the pair of first intermediate chrominance signals are comprised of third intermediate chrominance signals and fourth intermediate chrominance signals, the low pass filtering means further comprising:

a) first low pass filtering means for receiving the first intermediate luminance signals and transmitting those spatial frequency components of the first intermediate luminance signals below a first selected spatial frequency to provide second intermediate luminance signals;

b) second low pass filtering means for receiving the third intermediate chrominance signals and transmitting those spatial frequency components of the third intermediate chrominance signals below a second selected spatial frequency to provide fifth intermediate chrominance signals; and c) third low pass filtering means for receiving the fourth intermediate chrominance signals and transmitting those spatial frequency components of the fourth intermediate chrominance signals below a third selected spatial frequency to provide sixth intermediate chrominance signals.

12. The circuitry of claim 8 wherein the first tonescale transformation and the second tonescale transformation are selected from the group comprising a gamma function and an inverse gamma function.

13. Improved digital image processing circuitry for sharpening and transforming color space signals to luminance signals and a pair of chrominance signals, the circuitry comprising:

a) color processing means for receiving the color space signals and transforming the color space signals into first intermediate luminance signals and a pair of first intermediate chrominance signals;

b) sharpening means for receiving the color space signals, differentiating between selected high and low spatial frequency components of the color space signals and amplifying the selected high spatial frequency components of the color space signals to provide amplified high spatial frequency luminance signals;

c) low pass filtering means for receiving the first intermediate chrominance and luminance signals and for transmitting those spatial frequency components of the first intermediate chrominance luminance signals that are below a select spatial frequency to provide second intermediate luminance signals and a pair of second intermediate chrominance signals; and d) combining means for combining the low spatial frequency components of the second intermediate luminance signals with the amplified high spatial frequency luminance signals to provide sharpened luminance signals wherein the color space signals comprise a plurality of components for each pixel of the image being processed and wherein the sharpening means comprises:

summation means for receiving a select number of the components of the color space signals and for combining the components of the color space signals into composite color space signals;

first filtering and combining means for transmitting those spatial frequency components of the composite color space signals above a select spatial frequency to provide only high spatial frequency signals associated with the composite color space signals;

variance circuit for receiving the composite color space signals and for providing variance signals therefrom which are indicative of the statistical variance of the composite color space signals for a select group of pixels surrounding each pixel to be enhanced;

a first look up table containing values indicative of a plurality of adaptive amplification factors which vary as a function of different values of variance signals so as to distinguish between noise and signal information wherein the first look up table receives and transforms the variance signals to adaptive amplification factor signals;

second combining means for combining the high spatial frequency signals and the adaptive amplification factor signals to provide adaptively amplified high spatial frequency signals; and a second look up table containing values indicative of a plurality of precompensation factors which vary as a function of the different values of the adaptively amplified high spatial frequency signals wherein the second look up table receives and transforms the adaptively amplified high spatial frequency signals into compensated and amplified high spatial frequency signals which define the amplified high spatial frequency luminance signals.

14. The circuitry of claim 13 wherein the first filtering means comprises:

a) a low pass filter for receiving the composite color space signals and transmitting those spatial frequency components of the composite color space signals below a selected spatial frequency to provide low spatial frequency signals associated with the composite color space signals; and b) first combining means for transmitting those spatial frequency components of the composite color space signals above the low spatial frequency signals to provide high spatial frequency signals associated with the composite color space signals.

* * * * *